United States Patent
Mizutome et al.

[11] Patent Number: 5,903,253
[45] Date of Patent: May 11, 1999

[54] IMAGE DATA CONTROL APPARATUS AND DISPLAY SYSTEM

[75] Inventors: Atsushi Mizutome, Fujisawa; Osamu Yuki, Atsugi; Hiroshi Inoue, Yokohama, all of Japan

[73] Assignee: Canon Kabushiki Kaisha, Tokyo, Japan

[21] Appl. No.: 08/171,975

[22] Filed: Dec. 23, 1993

Related U.S. Application Data

[63] Continuation of application No. 07/720,191, Jun. 24, 1991, abandoned.

[30] Foreign Application Priority Data

Jun. 25, 1990 [JP] Japan .................................. 2-167641

[51] Int. Cl.⁶ .................................................. G09G 5/00
[52] U.S. Cl. .......................................... 345/132; 345/149
[58] Field of Search ........................... 345/1, 3, 89, 97, 345/98, 99, 100, 103, 147, 148, 149, 150, 154, 152, 132, 213; 348/434, 478

[56] References Cited

U.S. PATENT DOCUMENTS

| | | | |
|---|---|---|---|
| 4,367,924 | 1/1983 | Clark et al. | 350/334 |
| 4,531,160 | 7/1985 | Ehn | 340/793 |
| 4,684,942 | 8/1987 | Nishi et al. | 340/703 |
| 4,727,362 | 2/1988 | Rackley et al. | 345/213 |
| 4,791,417 | 12/1988 | Bobak | 340/793 |
| 4,827,255 | 5/1989 | Ishii | 340/793 |
| 4,850,677 | 7/1989 | Okumura | 345/89 |
| 4,855,724 | 8/1989 | Yang | 340/784 |
| 4,870,398 | 9/1989 | Bos | 345/97 |
| 4,908,609 | 3/1990 | Stroomer | 340/784 |
| 4,964,699 | 10/1990 | Inoue | 350/332 |
| 4,990,902 | 2/1991 | Zenda | 345/132 |
| 4,990,904 | 2/1991 | Zenda | 340/771 |
| 4,998,099 | 3/1991 | Ishii | 340/805 |
| 5,012,339 | 4/1991 | Kurata et al. | 358/148 |
| 5,059,962 | 10/1991 | Sekiya et al. | 345/149 |
| 5,060,055 | 10/1991 | Kim | 340/701 |
| 5,072,411 | 12/1991 | Yamaki | 340/825.32 |
| 5,095,301 | 3/1992 | Guttag et al. | 340/701 |
| 5,150,109 | 9/1992 | Berry | 340/703 |
| 5,155,478 | 10/1992 | Sekiya et al. | 345/3 |
| 5,252,959 | 10/1993 | Kono | 345/89 |
| 5,266,940 | 11/1993 | Shiraishi | 345/148 |
| 5,499,037 | 3/1996 | Nakagawa et al. | 345/89 |

FOREIGN PATENT DOCUMENTS

| | | |
|---|---|---|
| 0340664 | 8/1989 | European Pat. Off. . |
| 0354480 | 2/1990 | European Pat. Off. . |
| 0421772 | 4/1991 | European Pat. Off. . |

*Primary Examiner*—Steven J. Saras
*Assistant Examiner*—Paul A. Bell
*Attorney, Agent, or Firm*—Fitzpatrick, Cella, Harper & Scinto

[57] ABSTRACT

An image data control apparatus comprises a first circuit to generate image data, a second circuit to discriminate a display mode from a main body side and a third circuit to convert the image data in accordance with the discriminated display mode.

14 Claims, 15 Drawing Sheets

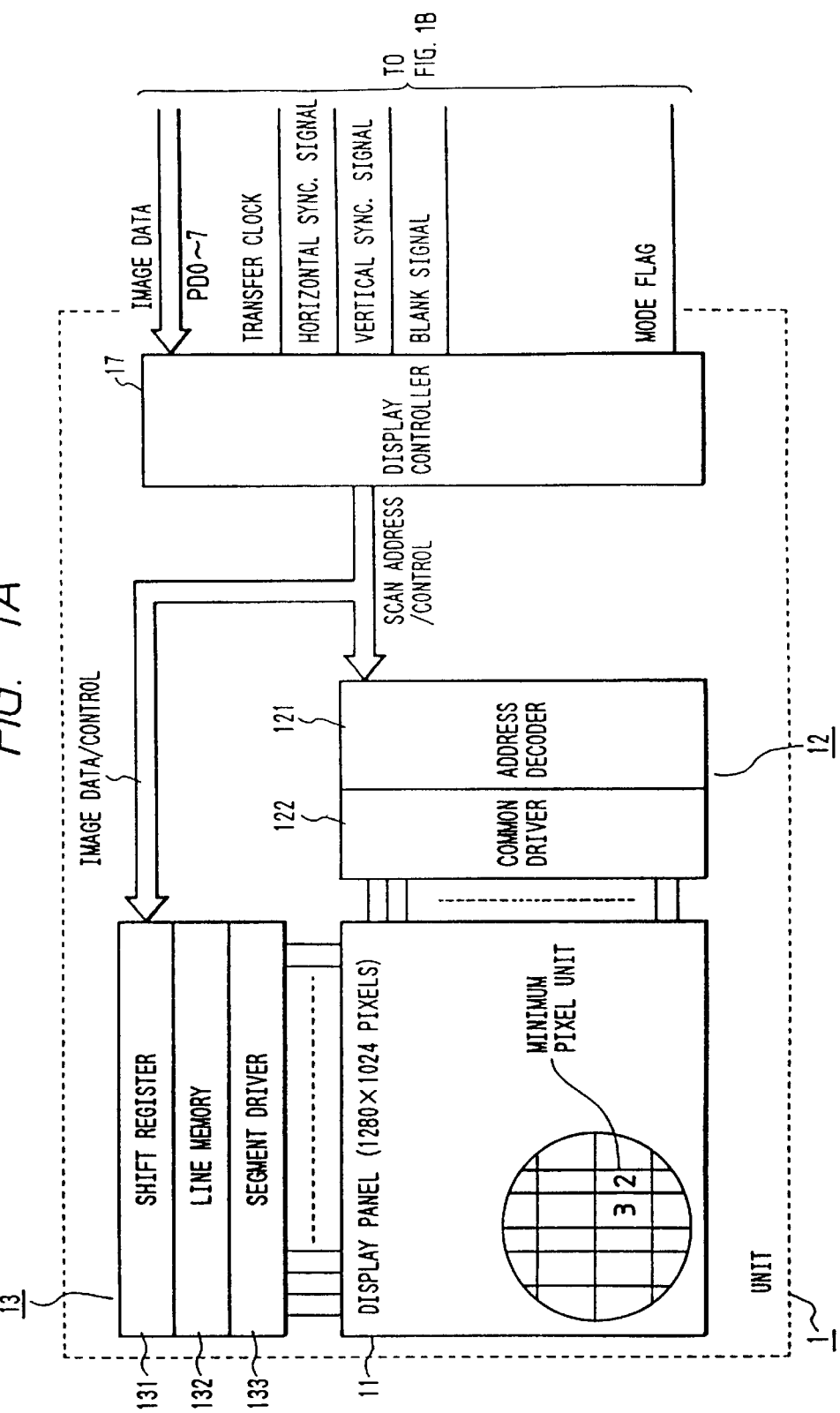

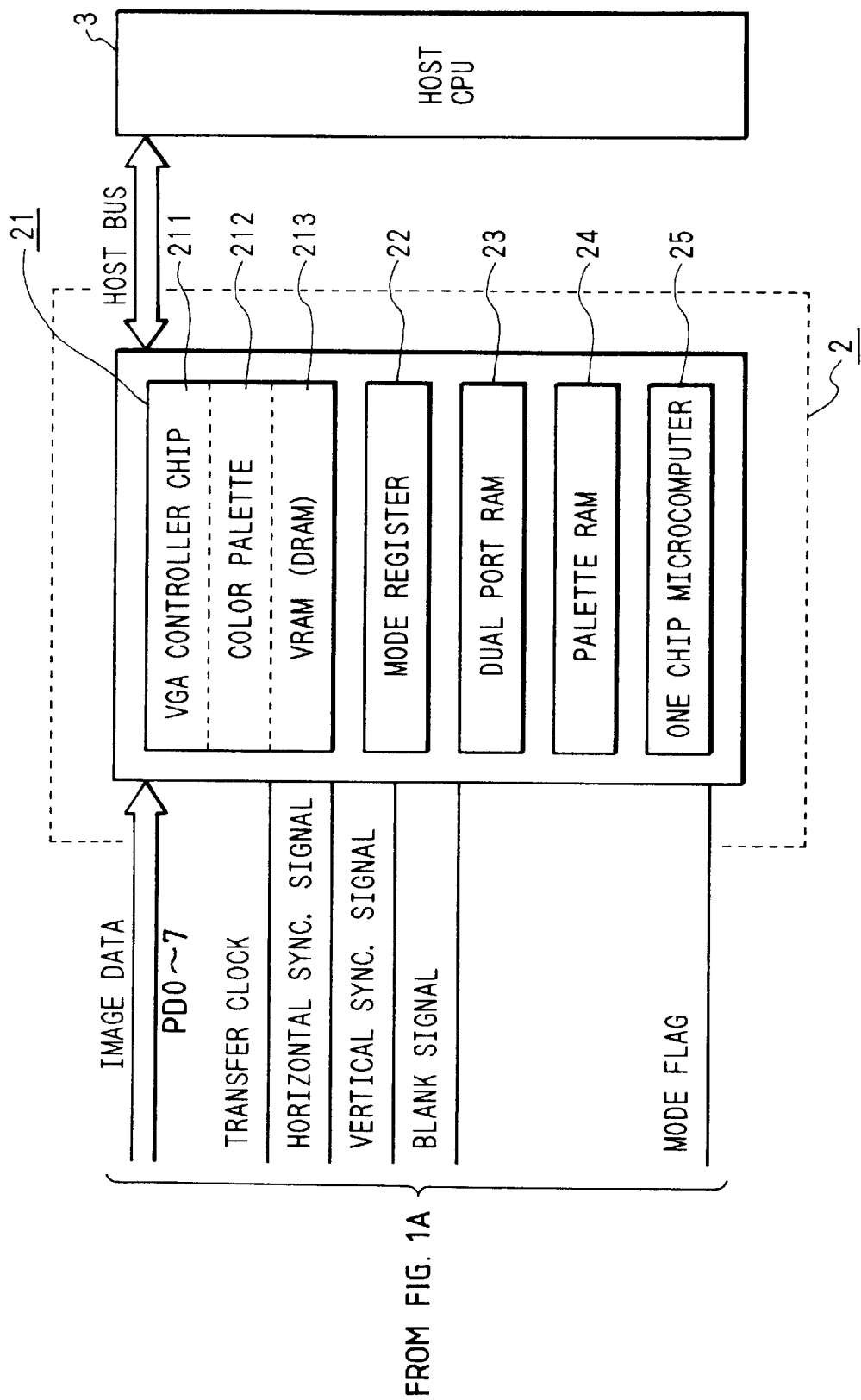

| REGISTER NAME | ADDRESS | TEST BIT | CONTENTS |
|---|---|---|---|
| DISPLAY CONTROL REGISTER | 3X4=17(h)<br>3X5 | 5 (ADW) | ADDRESS WRAPPING |
| OUTPUT OPERATION REGISTER | 3C2(WR)<br>3CC(RD) | 0 (IAS)<br>6 (HSP)<br>7 (VSP) | I/O ADDRESS SELECTION<br>HORIZONTAL SYNC. SIGNAL POLARITY SELECTION<br>VERTICAL SYNC. SIGNAL POLARITY SELECTION |
| GRAPHIC MODE CONTROL REGISTER | 3CE=05(h)<br>3CF | 6 (256) | 256 COLOR DISPLAY MODE |
| GRAPHIC REGISTER | 3CE=00(h)<br>3CF | 0 (GRM)<br>3 (MMI) | GRAPHIC MODE SELECTION<br>MEMORY MAP DESIGNATION |
| CLOCK MODE REGISTER | 3C4=01(h)<br>3C5 | 3 (DCK) | DOT CLOCK GEN. MODE |

(NOTE) X IS [B] UPON MONOCHRO-MODE AND [D] UPON COLOR-MODE

FIG. 3B

| DISPLAY MODE 0.1(h) | (MSB) IAS | HSP | MODE DISCRIMINATION REGISTER VSP | DCK | 256 | GRM | MMI | (LSB) ADW | DISCRIMINATION DATA D3(h) |
|---|---|---|---|---|---|---|---|---|---|
| 0, 1 | 1 | 1 | 0 | 1 | 0 | 0 | 1 | 1 | D3 |
| 2, 3 | 1 | 1 | 0 | 0 | 0 | 0 | 1 | 1 | C3 |
| 7 | 0 | 1 | 0 | 0 | 0 | 0 | 1 | 1 | 43 |
| 4, 5 | 1 | 1 | 0 | 1 | 0 | 1 | 1 | 1 | D7 |
| 6 | 1 | 1 | 0 | 0 | 0 | 1 | 1 | 0 | C6 |
| D | 1 | 1 | 0 | 1 | 0 | 1 | 0 | 1 | D5 |
| E | 1 | 0 | 1 | 0 | 0 | 1 | 0 | 1 | C5 |
| F | 0 | 0 | 1 | 0 | 0 | 1 | 0 | 1 | 25 |
| 10 | 1 | 1 | 1 | 0 | 0 | 1 | 0 | 1 | A5 |
| 11 | 1 | 1 | 1 | 0 | 0 | 1 | 0 | 0 | E4 |
| 12 | 1 | 1 | 1 | 0 | 0 | 1 | 0 | 1 | E5 |
| 13 | 1 | 1 | 0 | 0 | 1 | 1 | 0 | 1 | CD |

FIG. 4

| DISPLAY (MODE) | RESOLUTION (HOR. × VER.) | DISPLAY IN 1280×1024 PANEL (MAX ENLARGEMENT) |
|---|---|---|
| 0, 1 (h) | 360×400 | HOR.: DOUBLE + HOR. BORDER PART (560 DOTS)<br>VER.: DOUBLE + VER. BORDER PART (224 LINES) |
| 2, 3 | 720×400 | HOR.: SINGLE + HOR. BORDER PART (560 DOTS)<br>VER.: SINGLE + VER. BORDER PART (624 LINES) |
| 7 | 720×400 | HOR.: SINGLE + HOR. BORDER PART (560 DOTS)<br>VER.: SINGLE + VER. BORDER PART (624 LINES) |
| 4, 5 | 320×200 | HOR.: FOUR TIMES<br>VER.: DOUBLE(*1) + VER. BORDER PART (224 LINES) |
| 6 | 640×200 | HOR.: DOUBLE<br>VER.: DOUBLE(*1) + VER. BORDER PART (224 LINES) |
| D | 320×200 | HOR.: FOUR TIMES<br>VER.: DOUBLE(*1) + VER. BORDER PART (224 LINES) |
| E | 640×200 | HOR.: DOUBLE<br>VER.: DOUBLE(*1) + VER. BORDER PART (224 LINES) |
| F | 640×350 | HOR.: DOUBLE<br>VER.: DOUBLE + VER. BORDER PART (324 LINES) |
| 10 | 640×350 | HOR.: DOUBLE<br>VER.: DOUBLE + VER. BORDER PART (324 LINES) |
| 11 | 640×480 | HOR.: DOUBLE<br>VER.: DOUBLE + VER. BORDER PART (324 LINES) |
| 12 | 640×480 | HOR.: DOUBLE<br>VER.: DOUBLE + VER. BORDER PART (324 LINES) |
| 13 | 320×200 | HOR.: FOUR TIMES<br>VER.: DOUBLE(*1) + VER. BORDER PART (224 LINES) |

- HOR.: SINGLE    2 BITS/PIXEL (FIG. 8C)
         DOUBLE    4 BITS/PIXEL (FIG. 8B)
         FOUR TIMES    8 BITS/PIXEL (FIG. 8A)

- VER.: SINGLE    ONE SCAN LINE DRIVE (FIG. 8C)
         DOUBLE    TWO SCAN LINE DRIVE (FIG. 8B)
         FOUR TIMES    FOUR SCAN LINE DRIVE (FIG. 8A)

- BORDER PART: THE NUMBER OF DOT (LINES) IN MINIMUM PIXEL UNIT FOR BOTH OF HOR. AND VER.

(*1): DOUBLE RASTER SCAN BIT (BIT 7) OF MAXIMUM RASTER ADDRESS REGISTER IN DISPLAY CONTROL UNIT = 1

FIG. 6

| COLOR DATA | DATA TRANSFORM PALETTE RAM DATA | | | |
|---|---|---|---|---|
| R(h)×2 + G(h)×4 + B(h)×1 ··· | PL3 | PL2 | PL1 | PL-0 |
| 00 ~ 18 (h) | 0 | 0 | 0 | 0 |
| 19 ~ 36 (h) | 0 | 0 | 0 | 1 |
| 37 ~ 51 (h) | 1 | 0 | 0 | 0 |
| 52 ~ 6C (h) | 0 | 0 | 0 | 1 |
| 6D ~ 87 (h) | 0 | 0 | 1 | 0 |
| 88 ~ A2 (h) | 1 | 1 | 0 | 0 |
| A3 ~ BD (h) | 0 | 0 | 1 | 1 |
| BE ~ D8 (h) | 0 | 1 | 1 | 0 |
| D9 ~ F3 (h) | 1 | 0 | 0 | 1 |
| F4 ~ 10E (h) | 0 | 1 | 1 | 1 |
| 10F ~ 129 (h) | 1 | 1 | 1 | 0 |
| 12A ~ 144 (h) | 1 | 1 | 0 | 1 |
| 145 ~ 15F (h) | 1 | 0 | 1 | 1 |
| 160 ~ 180 (h) | 1 | 1 | 1 | 1 |

- R(h), G(h) AND B(h) ARE RESPECTIVELY 6 BITS COLOR DATA
- DATA OF DATA TRANSFORM PALETTE RAM IS 1 STATE UPON ON (WHITE) AND 0 STATE UPON OFF (BLACK)
- FOR DOUBLE ENLARGE DISPLAY (4 BITS/PIXEL), DATA PL0-3 IN DATA TRANSFORM PALETTE RAM IS VALID AND DATA OF PL4-7 IS "Don't care".

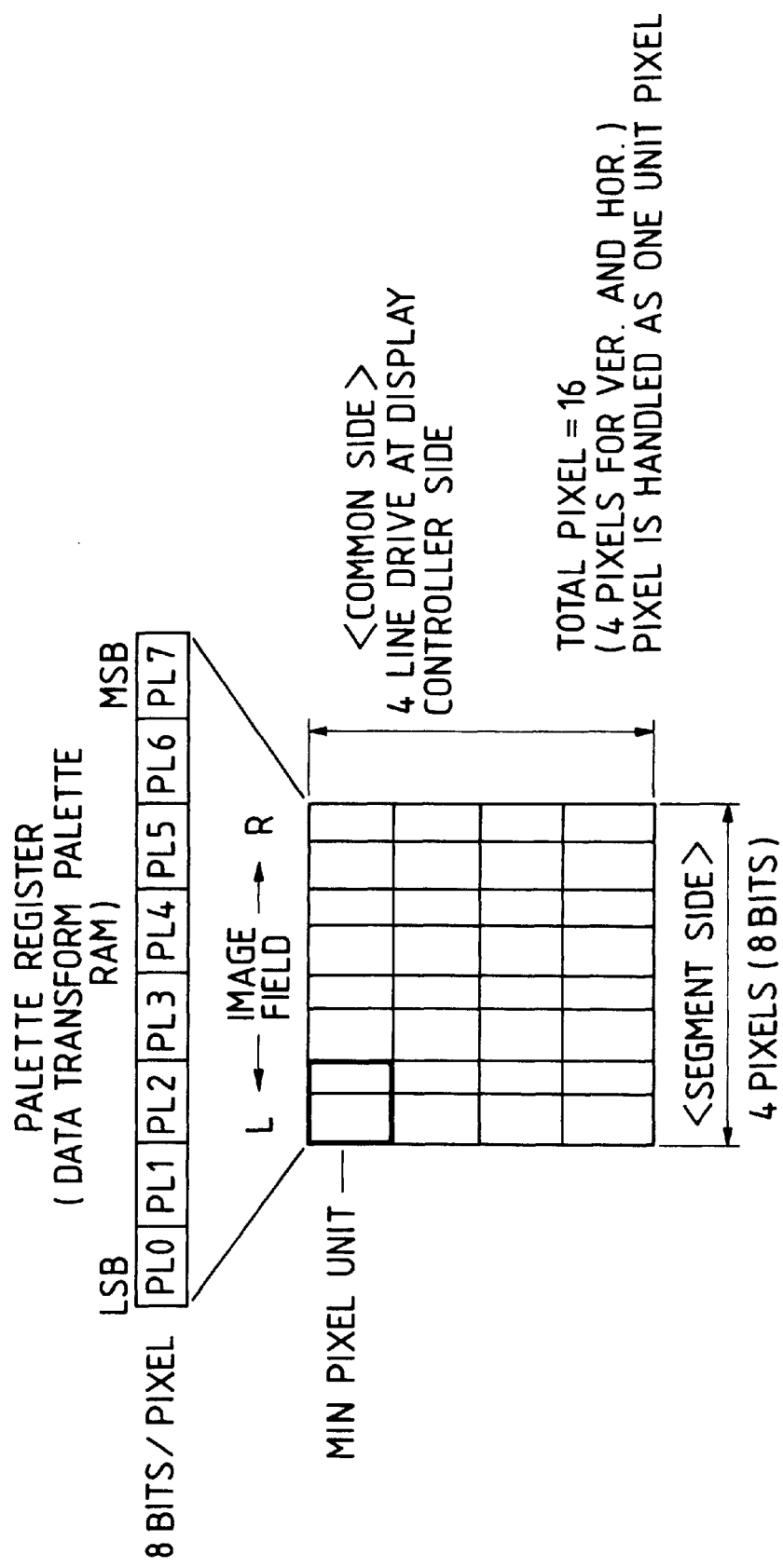

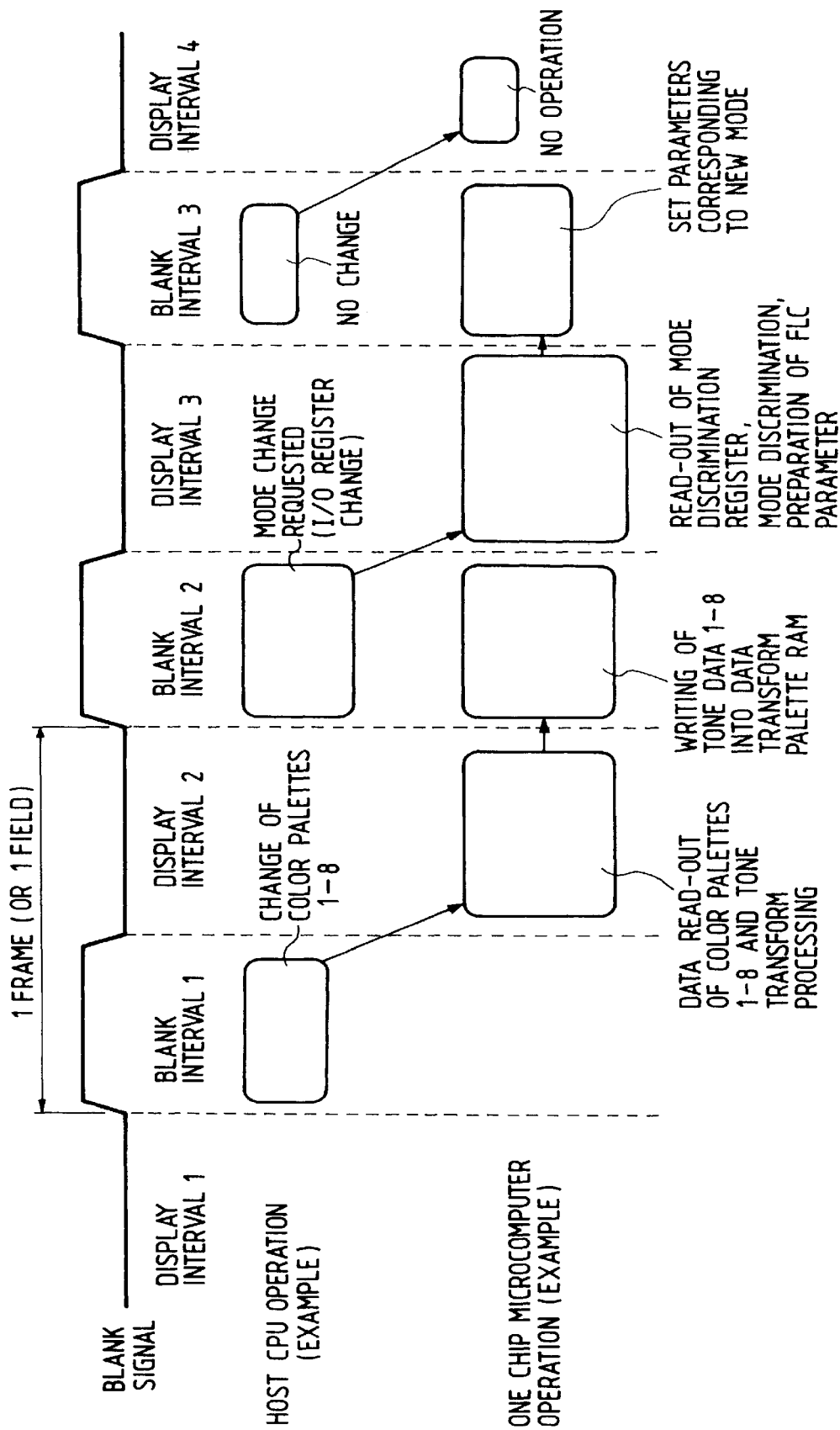

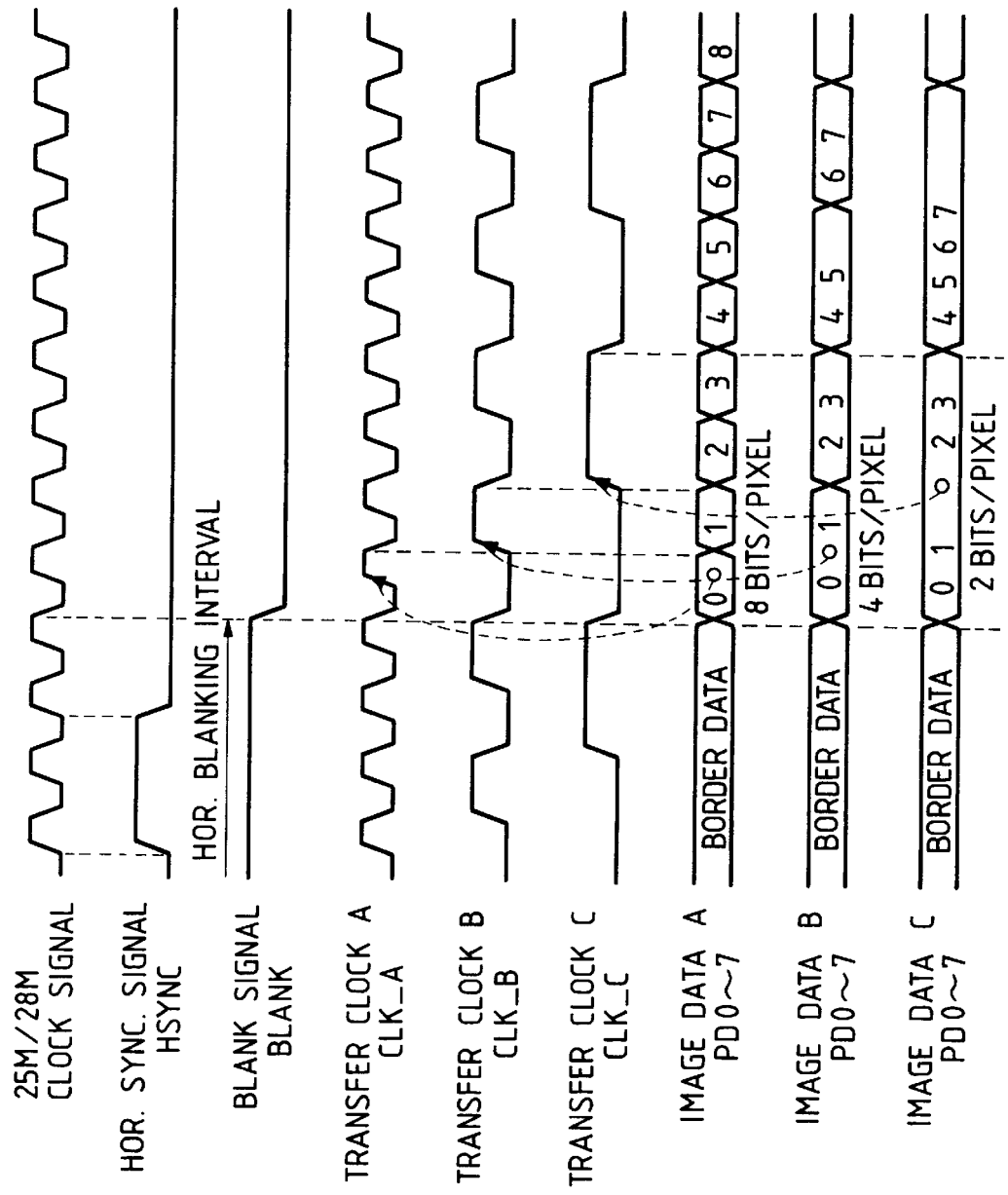

FIG. 11

| TRANSFORM MODE | PHASE | INPUT DATA (PALETTE DATA) | OUTPUT DATA |
|---|---|---|---|
| A | 1 | PL0 ~ 7 → | PD0 ~ 7 |
| B | 1 | PL0 ~ 3 | PD0 ~ 3 |
|   | 2 | PL0 ~ 3 | PD4 ~ 7 |
| C | 1 | PL0 ~ 1 | PD0 ~ 1 |
|   | 2 | PL0 ~ 1 | PD2 ~ 3 |
|   | 3 | PL0 ~ 1 | PD4 ~ 5 |
|   | 4 | PL0 ~ 1 | PD6 ~ 7 |

TRANSFORM MODE : A FOUR TIMES ENLARGEMENT DISPLAY (8 BITS/PIXEL)
B DOUBLE ENLARGEMENT DISPLAY (4 BITS/PIXEL)
C SINGLE (STANDARD) DISPLAY (2 BITS/PIXEL)

FIG. 12

| MODE (h) | RESOLUTION (HOR. × VER.) | DISPLAY COLOR | BITS/PIXEL |
|---|---|---|---|
| 0.1 | 360×400 | 16 | 4 |
| 2.3 | 720×400 | 16 | 4 |
| 7 | 720×400 | 16 | 4 |
| 4.5 | 320×200 | 4 | 2 |
| 6 | 640×200 | 2 | 1 |
| D | 320×200 | 16 | 4 |
| E | 640×200 | 16 | 4 |
| F | 640×350 | 4 | 2 |
| 10 | 640×350 | 16 | 4 |
| 11 | 640×480 | 2 | 1 |
| 12 | 640×480 | 16 | 4 |
| 13 | 320×200 | 256 | 8 |

IMAGE DATA CONTROL APPARATUS AND DISPLAY SYSTEM

This application is a continuation of application Ser. No. 07/720,191, filed Jun. 24, 1991, now abandoned.

BACKGROUND OF THE INVENTION

1. Field of the Invention

The invention relates to a display system and, more particularly, to an image data control apparatus in a display system using a ferroelectric liquid crystal having a memory performance.

2. Related Background Art

In recent years, in a liquid crystal display system which is required for a personal computer (PC), a work station (WS), or the like, a large display screen and high resolution have been realized year by year, and compatibility with an existing PC or WS is also required.

When explaining a PC/AT machine made by IBM Corporation, which is generally widely used as an example, as display modes which are used in a display system, there are display modes of the adapter specification for an image such as CGA (Color Graphics Array), EGA (Enhanced Graphics Array), VGA (Video Graphic Array), 8514/A, and the like made by IBM Corporation. The resolutions and the numbers of colors which can be displayed in the above display modes are respectively different.

As a system which can display such various display modes by a single display system, for instance, there have been known "Multisync II", "Multisync 3D", "Multisync 4D", "Multisync 5D", and the like made by NEC Corporation as CRT (Cathode Ray Tube) display systems. In the liquid crystal display system which can realize a PC or WS of the lap-top type, there is a problem such that it is difficult to enable various kinds of display modes to be displayed by a single display system.

Particularly, in the display system using the ferroelectric liquid crystal, as compared with the case of the CRT display system, the following considerations are needed with respect to the display color and the resolution and the compatibility with the CRT display system is small.

(1) With respect to the display color:

In the ferroelectric liquid crystal display device, a bistable orientation state, that is, a binary display state is realized as disclosed in U.S. Patent Ser. No. 4,367,924 by Clerk et al. or the like. In other words, there is a problem such that it is difficult to realize a tone expression by a control of an applied voltage or the like. To realize the tone display by such a binarization display device, the tone display (area tone display) is realized by changing a ratio of the numbers of white and black dots.

On the other hand, in the ordinary display mode, the CRT display system has been designed so as to emit a light by a luminance corresponding to a tone for one dot (luminance tone).

In the case where various display modes of different display colors are displayed by the ferroelectric liquid crystal display system, therefore, the luminance tone cannot be used, so that the tone information needs to be changed to the data of the area tone display system for every ferroelectric liquid crystal display system in accordance with each display mode.

(2) With respect to the resolution:

When the display mode used in the CRT display system is applied to the ferroelectric liquid crystal display system of a certain resolution (e.g., 640×480 pixels), in the case of the display mode of a resolution (e.g., 320×200 pixels) lower than the above resolution, surplus pixels occur. Or, in the case of the display mode of a resolution (e.g., 720×400 pixels) higher than the above resolution, the pixels lack in the horizontal direction. In such cases, it is necessary to expand or compress the image data in the vertical or horizontal direction.

On the other hand, since the ferroelectric liquid crystal panel has a memory effect, there is a problem such that a display state before switching in a border portion which occurs upon switching of the display mode mentioned above remains as an after image without being erased.

SUMMARY OF THE INVENTION

It is an object of the invention to provide a liquid crystal display system whose compatibility with a CRT display system has been improved and, more particularly, to provide a ferroelectric liquid crystal display system.

Another object of the invention is to provide a control system of image data in which compatibility with a CRT display system has been improved.

According to the first aspect of the invention, the above objects are accomplished by an image data control apparatus comprising: a. first means for outputting image data; b. second means for discriminating a display mode from the main body side; and c. third means for converting the image data in accordance with the discriminated display mode. The above objects are also accomplished by a display system using such an image data control apparatus.

According to the second aspect of the invention, the above objects are accomplished by an image data control apparatus comprising: a. first means for outputting image data; b. second means for discriminating a display mode from the main body side; c. third means for reading out color data from the first means; and d. fourth means for converting the color data in accordance with the discriminated display mode. The above objects are also accomplished by a display system using such an image data control apparatus.

According to the third aspect of the invention, the above objects are accomplished by an image data control apparatus comprising: a. first means for outputting image data; b. second means for discriminating a display mode from the main body side; c. third means for reading out color data from the first means; d. fourth means for converting the image data into an on/off signal; and e. fifth means for converting the color data in accordance with the discriminated display mode. The above objects are also accomplished by a display system using such an image data control apparatus.

BRIEF DESCRIPTION OF THE DRAWINGS

FIG. 1 is a block circuit diagram showing a display system of the invention;

FIG. 3A is an explanatory diagram showing VGA·I/O registers which have been referred to discriminate a display mode and have been used in the invention and a list of bits in the registers;

FIG. 3B is an explanatory diagram showing the contents of a mode discrimination register used in the invention;

FIG. 4 is an explanatory diagram showing display formats when displays in various display modes (0–13(h)) are executed on an FLC display panel of 1280×1024 pixels which has been used in the invention;

FIG. 6 is an explanatory diagram showing a conversion specification to tone data (4 bits/pixel) for a double enlargement display used in the invention;

FIGS. 8A, 8B and 8C are explanatory diagrams showing the relations between tone data in the data transform palette RAM and pixles of an actual display panel which have been used in the invention;

FIG. 9 is an explanatory diagram showing the relation between the reading and writing operations of a host CPU and a one-chip microcomputer which have been used in the invention;

FIG. 10 is a timing chart showing image data output format from a graphics controller of the invention;

FIG. 11 is an explanatory diagram showing a transform mode of a pixel selector according to the invention; and FIG. 12 is an explanatory diagram showing display modes in a graphics subsystem "VGA" made by IBM Corporation.

DETAILED DESCRIPTION OF THE PREFERRED EMBODIMENTS

Figures 2, 2A:
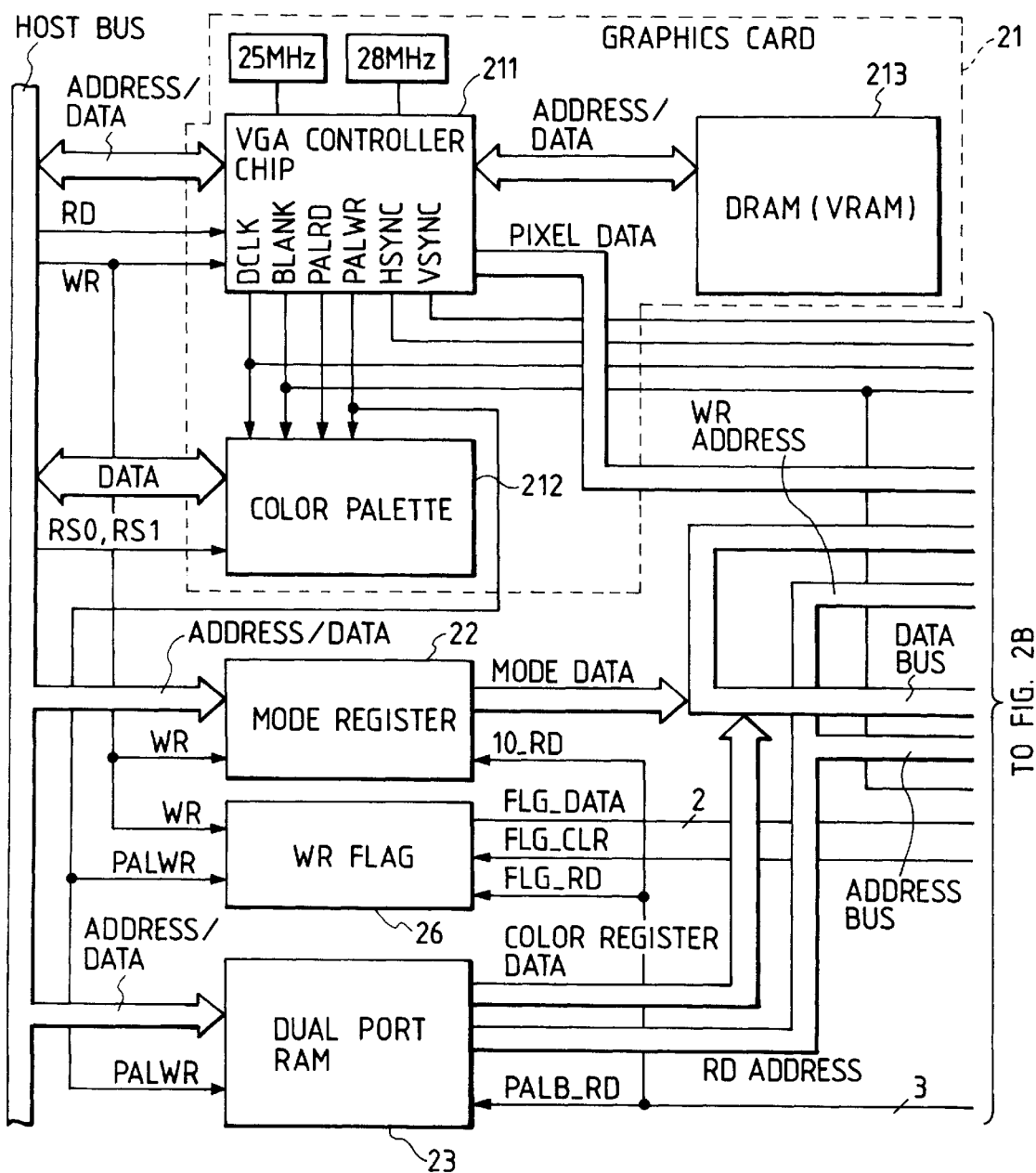
FIG. 2 is a block circuit diagram showing a graphics controller of the invention.
Figure 2B:
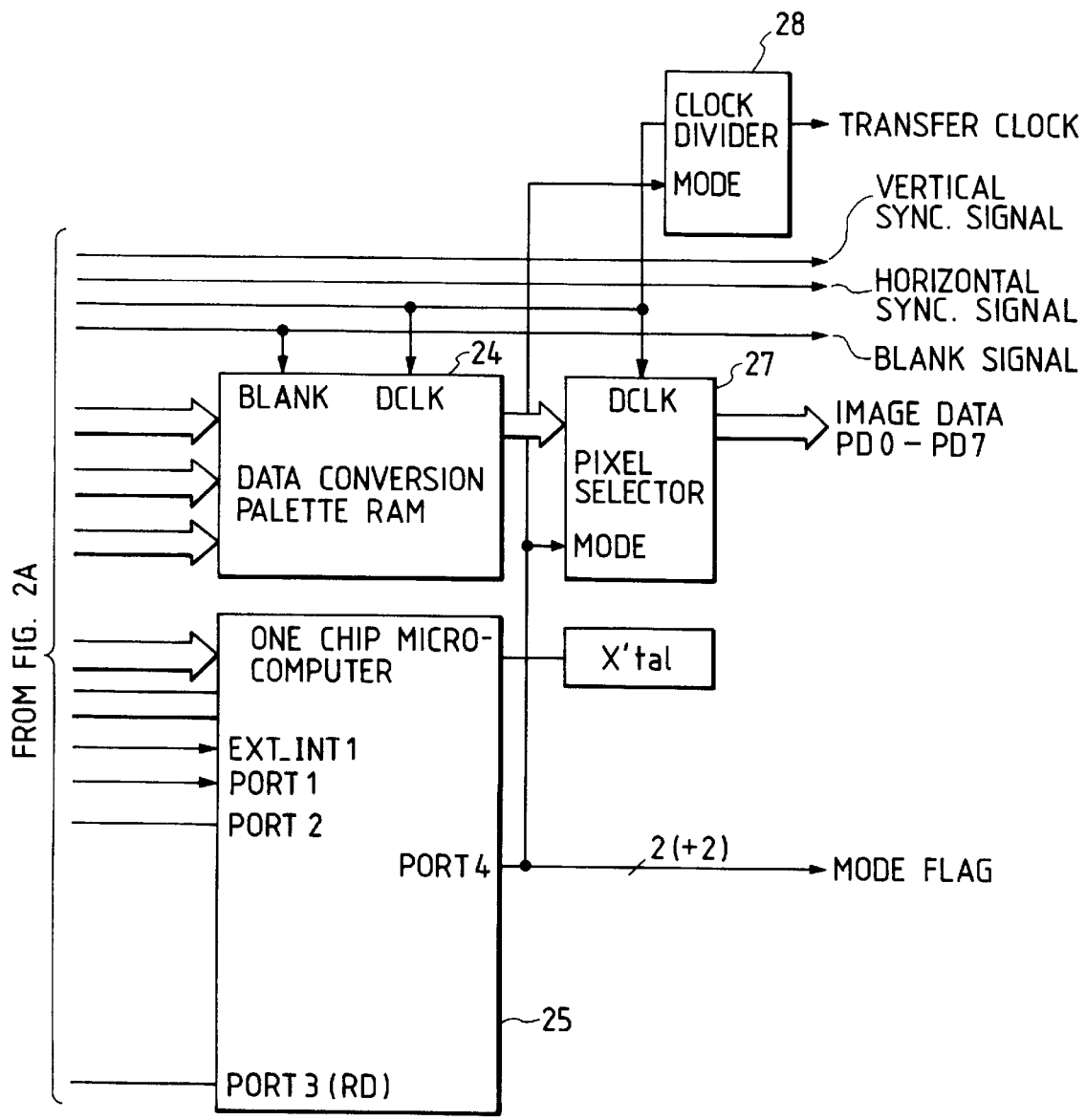

FIG. 1 is a block diagram showing a display system according to the invention. The display system comprises: a display unit section 1 using a ferroelectric liquid crystal (FLC); a graphics controller section 2; and a host CPU (Central Processing Unit) 3 such as a PC/AT apparatus made by IBM Corporation or the like.

A display panel 11 is constructed in a manner such that 1024 scanning electrodes and 2560 information electrodes (one pixel per two information electrodes) are arranged like a matrix and a ferroelectric liquid crystal (FLC) is sealed between two glass plates to which an orienting process has been executed. Scan lines are connected to a scanning electrode driving circuit 12 having an address decoder 121 and a common driver 122. Information lines are connected to an information electrode driving circuit 13 having a shift register 131, a line memory 132, and a segment driver 133. As shown in FIG. 1, one pixel has a 2 bits/pixel construction which has been divided at an area ratio of 3:2. A tone display of four levels per pixel is realized.

A display controller 17 receives display data $PD_0$ to $PD_7$ from the graphics controller 2 and controls the scanning electrode driving circuit 12 and the information electrode driving circuit 13.

The graphics controller 2 needs to be perfectly compatible with the CRT display system when the graphics controller 2 is seen from the host CPU 3. Therefore, the graphics controller 2 is constructed by adding a mode discrimination register 22 to discriminate a display mode, a dual port RAM 23 to read color data of a color palette 212, a data conversion palette RAM 24 to convert into data for the FLC, and a one-chip microcomputer 25 as a microprocessor to execute a whole control of the display to a graphics card 21 itself (VGA card as one of the graphics subsystems made by IBM Corporation as an example) which is used in the CRT display system. The one-chip microcomputer 25 manages the image data between the host CPU 3 and the display unit 1 and controls display timings and the like.

FIG. 2 is a block circuit diagram of the graphics controller 2 used in the invention. The circuit shown in FIG. 2 has the graphics card 21 comprising: a VGA controller chip 211 which is used as a standard device in the CRT display system; the color palette 212; and a VRAM (or DRAM) 213 which is used as a frame buffer. Further, the circuit shown in FIG. 2 comprises: the mode discrimination register 22 (I/O register of the VGA) to discriminate the display mode in the VGA controller chip 211; the dual port RAM 23 to read out the color data (R: red, G: green, B: blue; each color data consists of six bits) written in the color palette 212 (the dual port RAM 23 is used as a read only buffer); a WR flag 26 for detecting and holding write signals to the mode discrimination register 22 and dual port RAM 23; the data conversion palette RAM 24 to convert pixel data from the VRAM (or DRAM) 213 into area tone data; a pixel selector 27 to convert the image data from the data conversion palette RAM 24 into an output format suitable to transfer the image data to the display unit 1; and the one-chip microcomputer 25 for setting the data obtained by converting the color data from the color palette 213 into the data for the FLC in accordance with the display mode into the data conversion palette RAM 24 and for instructing to send the display mode information to the side of the display unit 1 by a flag (mode flag).

Signals used in FIGS. 1 and 2 are as shown in Table 1.

TABLE 1

| Symbol | Signal name | Contents |
| --- | --- | --- |
| RD | Host read signal | Read signal of host CPU 3 |
| WR | Host write signal | Write signal of host CPU 3 |
| RS0, RS1 | Register selection signal | Operating mode selection signal of color palette 212 Connected to lower two bits of host address |
| DCLK | Dot clock | Transfer clock of image data (pixel data) |
| BLANK | Blanking signal | Signal indicative of horizontal/vertical non-display interval |
| PALRD | Palette read signal | Read signal to color palette 212 |
| PALWR | Palette write signal | Write signal to color palette 212 |
| HSYNC | Horizontal sync signal | Horizontal synchronization signal |
| VSYNC | Vertical sync signal | Vertical synchronization signal |
| IO_RD | IO read signal | Read signal of VGA I/O register (mode discrimination register) |
| FLG_DATA | Flag data signal | Data (2 bits) of write flag to VGA I/O register and color palette 212 |
| FLG_CLR | Flag clear signal | Clear signal of write flag |
| FLG_RD | Flag read signal | Read signal of write flag |
| PALB_RD | Palette buffer read signal | Read signal of data (dual port RAM) of color palette 212 |
| EXT_INT1 | | External interruption terminal of one-chip microcomputer 25 |
| PORT1 | | FLG_DATA of one-chip microcomputer 25 Input port (2 bits) |
| PORT2 | | FLG_CLR of noe-chip microcomputer 25 Output port (2 bits) |
| PORT3 | | RD regarding signal of one-chip microcomputer 25 Output port (3 bits) |
| PORT4 | | Mode flag of one-chip microcomputer 25 Output port |
| X'tal | | Crystal (quartz oscillator) |
| MODE | Mode signal | Transfer clocks A, B, C in FIG. 10 are switched. |

The operation will now be described hereinbelow with reference to the drawings.

(1) VGA card 21 (graphics card 21)

In FIG. 2, a portion surrounded by a broken line generally operates as a VGA card in the case of the CRT display system so as not to be conscious that the display unit 1 is the FLC display unit when it is seen from the host CPU 3 (the display unit 1 is completely compatible with the CRT display system). The VGA controller chip 211 is an LSI to control the whole function of the VGA card 21 and is constructed by four control sections: a display control section; a graphics control section; a sequencer control section; and an attribution control section. A number of internal registers are arranged in each of the control sections and are accessed from an I/O port address of the host CPU 3. The host CPU 3 controls a group of those registers in accordance with each display mode, thereby setting timings of various control signals such as horizontal/vertical sync signals, blank signal, and the like and setting the color data to the color palette 212 and the like. As a specification of the VGA card, the host CPU 3 can not only set the contents of the internal registers of the VGA controller chip 211 but also successively read them back (read out). The VGA card 21, therefore, is set so that it can be always read/written from the side of the host CPU 3.

(2) Discrimination of the display mode and display format

To display all of the display modes on the display unit 1 using the FLC without any trouble, it is necessary to convert the color data which has been used in the conventional CRT display system, which will be explained hereinafter, or to send the mode flag to the display unit 1 side in accordance with the display mode which is selected on the host CPU 3 side. For this purpose, means for recognizing the display mode needs to be provided in the graphics controller 2. The VGA·I/O register (mode discrimination register 22) in FIG. 2 is provided to recognize the display mode. As mentioned above, the host CPU 3 changes the setting of a few registers in the VGA controller chip 211 in accordance with the display mode. The VGA·I/O register (mode discrimination register 22) which is changed in accordance with the display mode change is also arranged out of the VGA controller chip 211 as a write only type when it is seen from the host CPU 3, thereby enabling the display mode to be discriminated by allowing the data in the register 22 to be referred by the one-chip microcomputer 25.

The one-chip microcomputer 25 checks the WR flag 26 regarding the mode discrimination register 22 for a period of time (during a display interval) other than the time of the turn-on of the power supply and other than a vertical blanking interval. Thus, if data has already been written (the IO_WR flag 26 as a write flag of the I/O register has been set to "1"), the contents in the mode discrimination register 22 are read, thereby discriminating the presence or absence of a change in display mode (the operation for the display period of time). If the display mode has been changed, a change of setting of the data conversion palette RAM 24, which will be explained hereinlater, and a change in mode flag which is sent to the display unit 1 are executed in the vertical blanking interval.

FIG. 3A shows the VGA·I/O registers (mode discrimination register 22) which have been referred to discriminate the display mode and a list of bits in the registers. As shown in FIG. 3A, the display mode can be discriminated by the test bits at eight total positions of five kinds of VGA·I/O registers. Actually, the test bits are arranged in accordance with the order as shown in FIG. 3B and are handled as one mode discrimination register 22. Twelve kinds of display modes are recognized by the data in the register 22.

Figure 5A:
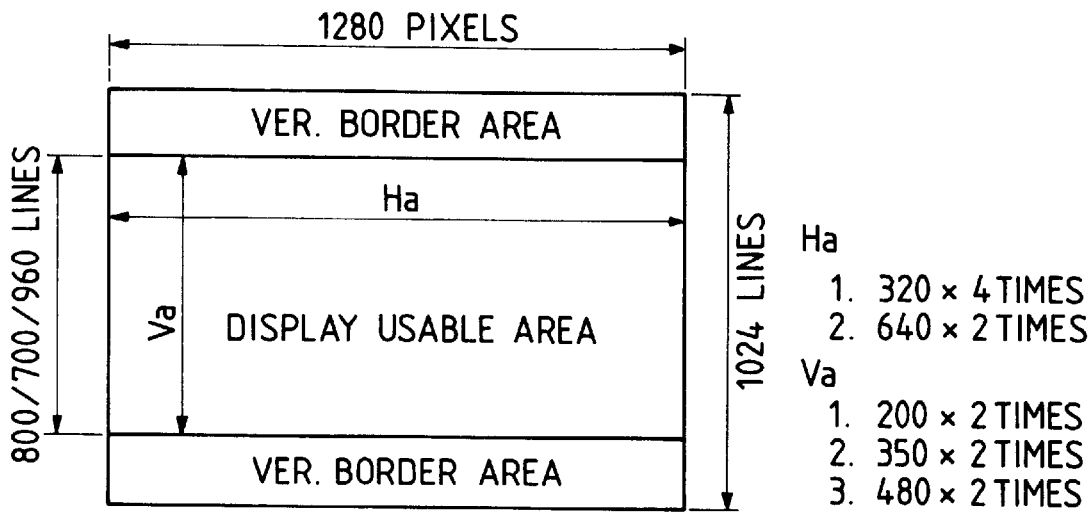
FIGS. 5A and 5B are explanatory diagrams each showing the relation between a display usable area and horizontal/vertical border areas which have been used in the invention.
Figure 5B:
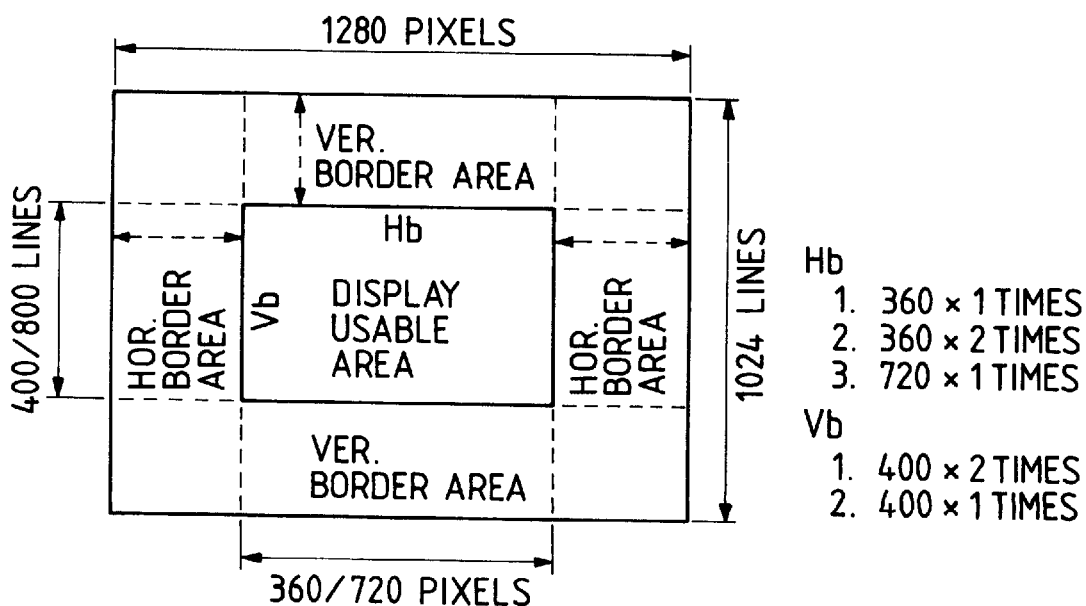

FIG. 4 shows display formats (VGA modes) when the FLC display panel 11 of 1280×1024 pixels executes the display in the display modes (0–13(h)). Further, FIGS. 5A and 5B show the relations between the display usable area and the horizontal/vertical border areas. As an example, in the case where the display mode 4,5(h) has been selected in FIG. 4, the enlargement display of single to four times can be performed for the standard number of pixels. In this case, the image data is expanded in the horizontal direction by a color data converting process (function on the side of the graphics controller 2), which will be explained hereinlater. On the other hand, in association with the enlargement in the horizontal direction, a similar process also needs to be executed with respect to the vertical direction. The enlarging process in the vertical direction is realized in a manner such that the display controller 17 in the FLC display unit 1 controls the common driver 122 so as to simultaneously select and drive two or four scan lines of the display panel 11. Therefore, the graphics controller 2 sends magnifications (1, 2, 4 here) for enlargement display according to the display mode as a mode flag to the display controller 17 side and must inform the presence or absence (the number of scan lines) of the simultaneous driving of a plurality of scan lines. FIG. 5A shows a display format in the case where the horizontal border doesn't exist and the vertical border exists. FIG. 5B shows a display format in the case where both the horizontal and vertical borders exist.

(3) Converting process of color data

In the case of displaying various display modes of different display colors by the FLC display panel 11 as mentioned above, in accordance with the display mode, the color data in the depth direction of the tone as in the CRT display system is converted into the tone (area tone) data in the horizontal direction (extending direction) in accordance with the actual arrangement of the pixels of the FLC display panel 11.

<Reading of color data>

According to the specification of the card (in the case of the VGA) of the graphics card 21, the color data (R, G, and B data each consisting of six bits) generated from the color palette chip 212 can be read/written by the host CPU 3 at arbitrary timings. Therefore, in the graphics controller 2 of the invention, in order to read the color data generated from the color palette chip 212, the dual port RAM 23 is provided for the same addresses as those in the color palette chip 212 in a manner such that it functions as a write only RAM when it is seen from the host CPU 3 side and that it functions as a read only RAM when it is seen from the one-chip microcomputer 25 side. With the above construction, the color data can be read fundamentally irrespective of the read back timing of the host CPU 3.

In a manner similar to the case of the mode discrimination register 22, the one-chip microcomputer 25 checks the WR flag 26 (PALWR flag) regarding the dual port RAM 23 for a period of time (during the display interval) other than the vertical blanking interval. Thus, in the case where the data has already been written (the setting of the color data of the color palette chip 211 has been changed), the contents (R, G, and B color data each consisting of six bits) in the dural port RAM 23 are read.

<Conversion to tone data for FLC>

Conversion specification from the read color data into the tone data for the FLC will now be described. As an example, FIG. 6 shows a conversion specification from the color data generated from the color palette 212 into the tone data (4 bits/pixel) for the FLC when the double enlargement display is executed. As shown in FIG. 6, constants such as 2, 4, and 1 are multiplied (weighting as luminance tones) to the R, G, and B color data each consisting of six bits which have been read and the resultant data are added, thereby executing the conversion from the color data to the luminance tone data. The luminance tone data derived as mentioned above is divided every predetermined level (in the embodiment, 14 levels), thereby deciding the tone data for every luminance range (data which is set into the data conversion palette RAM 24). It is desirable to previously store such tone data as a table into an ROM area or the like in the one-chip microcomputer 25. When the area tone data is decided from the luminance tone data, the pixel construction of the display panel 11 as an object and the gamma characteristics must be sufficiently considered. The above converting processes are fundamentally executed in a period of time other than the vertical blanking (or vertical sync signal) interval, namely, within the display period of time.

<Setting of data conversion palette RAM 24 (writing of tone data)>

Figure 7:
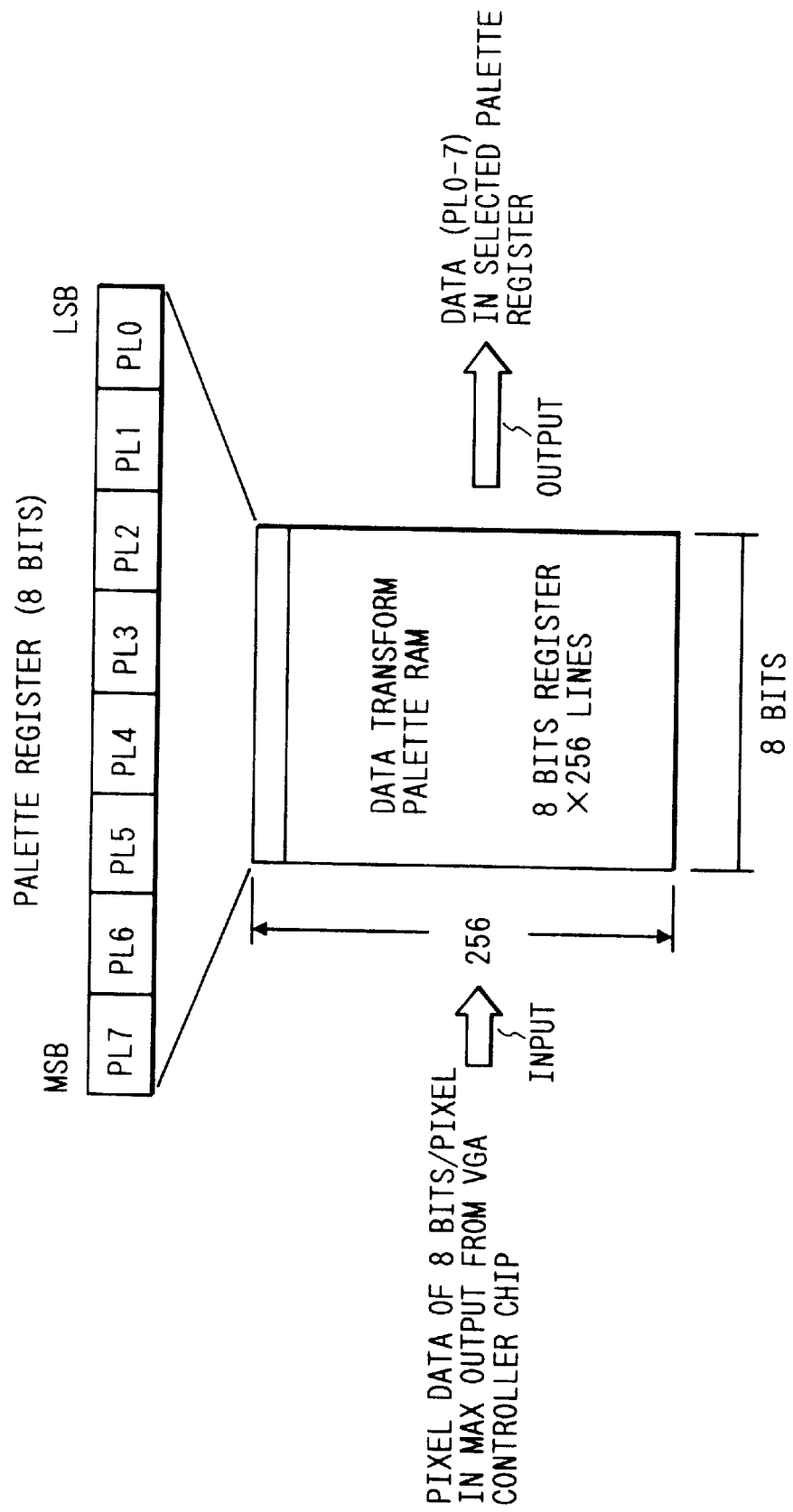
FIG. 7 is a constructional diagram of a data transform or conversion palette RAM used in the invention.

The data conversion palette RAM 24 is a lookup table which is constructed by 256×a register having a length of eight bits called a palette register. FIG. 7 shows a construction of the RAM 24. The pixel data which is supplied via the VGA controller chip 211 functions as addresses in the data conversion palette RAM 24. Tone data ($PL_0$ to $PL_7$) stored in the selected addresses are generated.

The writing operation of the tone data which has been converted as mentioned above into the data conversion palette RAM 24 is executed at the time of turn-on of the power supply and in the vertical blanking (or vertical sync signal) interval by the one-chip microcomputer.

Figure 8B:
Figure 8C:

FIG. 8 shows the relation between the tone data in the data conversion palette RAM 24 and the actual pixels in the display panel 11. In FIG. 8, FIG. 8C shows the minimum pixel unit of the display panel 11 used in the embodiment. As mentioned above, one pixel is divided into two regions at an area ratio of 3:2. The area tone display of 4 levels/pixel is realized by independently driving those two regions. FIGS. 8B and 8C show handlings of one pixel in the enlargement display mode. By combining and handling four pixels as one pixel and by combining and handling sixteen pixels as one pixel, respectively, the enlargement display of double and four times are executed. The numbers of tones which can be displayed are also increased to eight levels and sixteen levels (simple luminance calculation). As shown in FIG. 8, the data in the data conversion palette RAM 24 directly corresponds to the ON/OFF data of each pixel in the segment (information line) direction on the display panel 11 in a 1:1 corresponding relation.

With respect to a series of operations as described above, FIG. 9 shows the relation of the reading/writing operations as an operation flow of the host CPU 3 and the one-chip microcomputer 25 with regard to a simple event as an example. The host CPU 3 fundamentally changes the display mode and color palette within the blanking interval (during the non-display period of time). The one-chip microcomputer 25 side, therefore, reads the above changed data for the display period of time and also executes the processes until the converting process as necessary. The setting of the data conversion palette RAM 24 and the mode flag are changed in the blanking interval after one frame (one field). The color palette 212 and the mode discrimination register 22 are examined for the display period of time. If nothing is changed, no process is performed in the next blanking interval.

(4) Image data output format

FIG. 10 shows an image data output format from the graphics controller 2 according to the invention. In FIG. 10, periods of the horizontal sync signal (HSYNC) and blanking signal (BLANK) are the same as those of the signals which are generated from the VGA card used as a standard card. To execute the various display modes and enlargement display as mentioned above, the transfer clock and the image data are transformed to the specification for the FLC display by a clock divider and a pixel selector.

A clock divider 28 shown in FIG. 2 frequency divides a clock signal (28 MHz/25 MHz) from the VGA card and generates transfer clocks to the FLC display unit in accordance with the selected enlargement display mode (bits/pixel). For instance, in the case of 8 bits/pixel, the clock signal from the graphics card 21 is directly used as transfer clocks. In the case of 4 bits/pixel, the clock signal from the graphics card 21 is frequency divided into ½ and the resultant signal is used as transfer clocks. The resultant transfer clocks are generated from the clock driver 28.

On the other hand, the pixel selector 27 executes processes for converting the ON/OFF data ($PL_0$ to $PL_7$) of the pixels which are supplied from the data conversion palette RAM 24 into the number of bits which can be displayed in accordance with the enlargement display mode and for transferring as image data of a width of eight bits. FIG. 11 shows a transform mode of the pixel selector 27. For instance, in the case of the double enlargement display, a transform mode B is selected. At this time, since the number of area tone data which can be obtained per pixel is equal to four bits, only lower four bits ($PL_0$ to $PL_3$) are first extracted from the data $PL_0$ to $PL_7$ of the 8-bit width which are supplied from the data conversion palette RAM 24 at the first phase and are stored into the image data $PD_0$ to $PD_3$. Subsequently, the lower four bits ($PL_0$ to $PL_3$) are likewise extracted from the data $PL_0$ to $PL_7$ which are read out at the second phase and are stored into the image data $PD_4$ to $PD_7$. The data of eight bits is derived by two phases as mentioned above and is sent to the FLC display unit 1 side together with the transfer clocks.

(5) Display mode

FIG. 12 shows display modes in the VGA mode by IBM Corporation.

With respect to the display color:

As will be understood from FIG. 12, the number of constructing bits per pixel (bits/pixel) differs depending on each display mode and the storage format in the image memory (VRAM 213) also differs. The display mode having a large number of constructing bits per pixel can obviously perform the multi-color display.

The display mode 13(h) (VGA) which can display the maximum number of colors in the graphics subsystems of the personal computer mode by IBM Corporation will now be explained as an example. An output flow of the color data will now be explained hereinbelow. When the VGA controller chip 211 accesses a certain address in the VRAM 213 as a frame buffer, the image data stored in the address is added with attribution data via the VGA controller chip 211 and is generated as data of 8 bits/pixel. The image data having the attribute data functions as an address to select the color register in the color palette in which the color data has previously been stored. In the case of the VGA, the color palette 212 has 256 color registers of 18 bits (R, G, B data each consisting of 6 bits). The color data has been stored in the color registers. When one of the 256 color registers is selected by the image data from the VRAM, the color data comprising the R, G, and B data each consisting of six bits is read out and is supplied to D/A converters in the same color palette. One D/A converter is provided for each of the R, G, and B data. Each D/A converter converts the 6-bit digital color data into the analog signal.

Such a color data outputting method (color palette+analog output) has an advantage such that the multi-color display can be realized in spite of the fact that a data amount in the VRAM is not so large and an advantage such that by rewriting the data in the color registers, the color on the display screen can be changed without rewriting the data in the VRAM and an advantage such that the number of connecting lines with the display can be reduced. Such an outputting method, therefore, is a standard method mainly in present personal computers.

With respect to the resolution:

In FIG. 12, the resolution also differs depending on each display mode. For example, the resolution is set to 320×200 pixels in the case of the mode D(h) and 640×480 pixels in the case of the mode 12(h).

Although the ferroelectric liquid crystal panel has been used in the embodiment of the invention, the invention can be also applied to an active matrix type liquid crystal (TN liquid crystal) panel using a thin-film transistor.

As described above, in the ferroelectric liquid crystal display apparatus having a bistability, the graphics card which is generally used in the CRT display system is provided with: the register to discriminate the display mode from the host CPU 3; the dual port RAM (read only buffer 23) to read the color data of the color palette which is generally used in the CRT display system; the data conversion palette RAM 24 to convert the image data which is read out of the image memory into the ON/OFF data of the pixels of the display apparatus which has been predetermined; the microprocessor unit (MPU) 25 to execute a whole control; and the like. The image data in the CRT display system is converted into the image data for liquid crystal display in accordance with the display mode selected by the host CPU 3. The resultant image data is generated at the image data output period (horizontal/vertical sync signals) upon CRT display. Thus, various kinds of display modes which have conventionally been used in the CRT display system can be displayed by the ferroelectric liquid crystal display apparatus without any trouble while keeping perfect compatibility with the CRT display system when it is seen from the host CPU 3.

What is claimed is:

1. An image data control apparatus, comprising:

first graphic control means, compatible with a CRT display system, for generating first image data specified by the CRT display system;

second graphic control means, separated from said first graphic control means, and having detecting means for detecting a resolution of the first image data of predetermined resolution including a luminance gradation data generated by said first graphic control means, for designating a number of constituent pairs of binary bits of a unit pixel forming a display unit, according to resolution detected by said detecting means, wherein each said unit pixel has a memory function and is driven independently, and including means for increasing the number of constituent Pairs of binary bits of a unit pixel;

means for converting the luminance gradation data in the first image data into an area gradation data, for generating the area gradation data of a gradation number designated according to the number of the constituent pairs designated, and for independently controlling the bits so that one binary state is selected per the binary bits of the designated constituent number;

means for operating said second graphic control means in accordance with a display mode of the first image data generated by said first graphic control means;

mode indicating means for indicating the display mode of said first graphic control means; and means for controlling a common driver of a display panel so that, when an enlargement display is performed for a standard number of pixels of a resolution detected by said detecting means, the enlargement in a vertical direction is executed by scanning simultaneously plural scanning lines.

2. An apparatus according to claim 1, wherein the first image data is transferred synchronously with a horizontal sync signal and a vertical sync signal.

3. An apparatus according to claim 1, further comprising reading means for reading out color data from said first graphic control means, wherein said second graphic control means includes converting means for converting the color data in accordance with an indicated display mode.

4. An apparatus according to claim 3, wherein said converting means converts the color data into on/off data.

5. An apparatus according to claim 4, wherein the on/off data from said converting means is set in a period of time of a vertical sync signal or vertical blanking signal when the display mode is changed.

6. An apparatus according to claim 3, wherein the color data is transferred synchronously with a horizontal sync signal and a vertical sync signal.

7. A display system comprising:

a display panel having a driving circuit and an arrangement of a plurality of pixels, one of which comprises a plurality of bits driven independently of each other;

first graphic control means, compatible with a CRT display system, for generating first image data specified by the CRT display system;

second graphic control means, separated from said first graphic control means, and having detecting means for detecting a resolution of the first image data of predetermined resolution including a luminance gradation data generated by said first graphic control means, for designating a number of constituent pairs of binary bits of a unit pixel forming a display unit, according to resolution detected by said detecting means, wherein each said unit pixel has a memory function, and is driven independently, and including means for increasing the number of constituent pairs of binary bits of a unit pixel;

means for converting the luminance gradation data in the first image data into an area gradation data, for generating the area gradation data of a gradation number designated according to the number of the constituent pairs designated, and for independently controlling the bits so that one binary state is selected per the binary bits of the designated constituent number;

means for operating said second graphic control means in accordance with a display mode of the first image data generated by said first graphic control means;

mode indicating means for indicating the display mode of said first graphic control means; and means for controlling a common driver of said display panel so that, when an enlargement display is performed for a standard number of pixels of a resolution detected by said detecting means, the enlargement in a vertical direction is executed by scanning simultaneously plural scanning lines.

8. A display system according to claim 7, wherein said display panel is a liquid crystal panel.

9. A display system according to claim 7, wherein said display panel is a ferroelectric liquid crystal panel.

10. A display system according to claim 7, wherein the first image data is transferred synchronously with a horizontal sync signal and a vertical sync signal.

11. A display system according to claim 7, further comprising reading means for reading out color data from said first graphic control means, wherein said second graphic control means includes converting means for converting color data in accordance with an indicated display mode.

12. A display system according to claim 11, wherein said converting means converts the color data into on/off data.

13. A display system according to claim 12, wherein the on/off data from said converting means is set in a period of time of a vertical sync signal or vertical blanking signal when the display mode is changed.

14. A display system according to claim 11, wherein the color data is transferred synchronously with a horizontal sync signal and a vertical sync signal.

* * * * *

UNITED STATES PATENT AND TRADEMARK OFFICE
CERTIFICATE OF CORRECTION

PATENT NO. : 5,903,253

DATED : May 11, 1999

INVENTOR(S) : Mizutome et al.

It is certified that error appears in the above-identified patent and that said Letters Patent is hereby corrected as shown below:

COLUMN 9:

Line 63, "Pairs" should read --pairs--.

Signed and Sealed this

Eighteenth Day of January, 2000

Attest:

Q. TODD DICKINSON

*Attesting Officer*  *Commissioner of Patents and Trademarks*